Figures 1, 2:
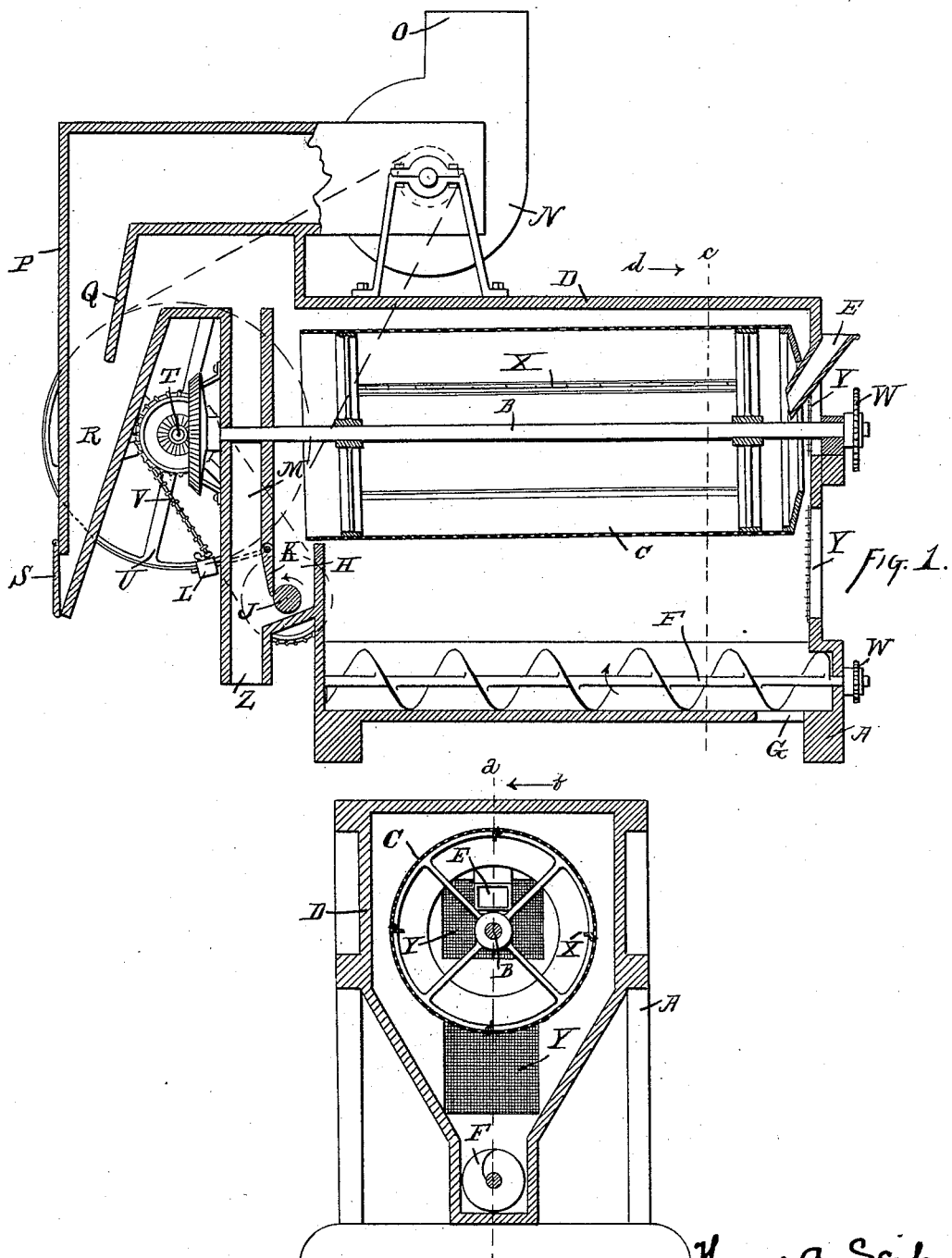

(No Model.)

T. A. SEIP.
ROLLING SCREEN.

No. 486,592. Patented Nov. 22, 1892.

Witnesses:
P. P. Sheehan
M. S. Belden

Inventor
Thomas A. Seip
by James W. See
Attorney

UNITED STATES PATENT OFFICE.

THOMAS A. SEIP, OF DAYTON, ASSIGNOR OF ONE-HALF TO PETER B. HOLLY AND CHRISTIAN A. SALZMAN, OF HAMILTON, OHIO.

ROLLING SCREEN.

SPECIFICATION forming part of Letters Patent No. 486,592, dated November 22, 1892.

Application filed August 8, 1892. Serial No. 442,455. (No model.)

*To all whom it may concern:*

Be it known that I, THOMAS A. SEIP, of Dayton, Montgomery county, Ohio, have invented certain new and useful Improvements in Rolling Screens, of which the following is a specification.

This invention pertains to improvements in rolling screens for the cleaning of grain; and my present improvements will be readily understood from the following description, taken in connection with the accompanying drawings, in which—

Figure 1 is a vertical longitudinal section of my improved rolling screen, the plane of the section being indicated by the line $a$ Fig. 2, viewed in direction of arrow $b$ of Fig. 2; and Fig. 2, a vertical transverse section of the machine in the plane of line $c$ of Fig. 1, viewed in the direction of arrow $d$.

In the drawings, A indicates the framing; B, the screen-shaft supported therein at a slight inclination from the horizontal; C, a perforated cylindrical screen concentrically carried by the screen-shaft, this screen being entirely open at its lower end and inwardly flanged at its other end; D, a casing forming a chamber containing the screen; E, the inlet-spout leading to the interior of the screen at its higher end; F, a conveyer disposed along under the screen at the base of the casing, the side walls of the casing diverging to cause the contents of the casing to flow to the conveyer; G, the outlet from the conveyer; H, a discharge-passage into which the open lower end of the screen discharges, this passage extending downwardly from the lowest portion of the screen; J, a distributing-roller extending across the base of this discharge-passage and serving to close the outlet of the passage; K, a hinged portion of one of the walls of passage H at the roller J, this hinged portion of the wall forming a gate, with its lower edge resting against the roll, the roll and gate thus forming a complete closure of the passage H, but the downward swinging of the gate away from the roll permitting the discharge of material from the passage H; L, a weighted lever upon gate K, the weight tending to press the gate closed against roll J, but yielding properly for the passage of material being discharged past the gate and roller; M, a passage extending past the gate and roller, the lower portion of this passage, below the roll and gate, forming virtually a downward prolongation of the discharge-passage H beyond the gate and roll, while the upper portion of the passage M, above the gate and roll, forms a suction-conduit; N, a fan having its suction in free communication with the main casing-chamber around the screen and with the interior of the screen through its open end and with the upper end of passage M; O, the discharge connection of the fan; P, the suction-conduit of the fan, having the connections above referred to, and having also a downwardly-projecting trap R; Q, a partition in the suction-chamber P, extending downwardly into the trap R, the result being that matters sucked by the fan from the screen and the chamber around it and the conduit M must on their way to the fan dive under the partition Q, thus abruptly changing their direction of motion; R, the trap previously referred to; S, a light gravity-door at the base of the trap; T, a shaft carried by the framing and bevel geared to screen-shaft B and adapted to have rotary motion imparted to it by any ordinary means of transmission for the purpose of driving the apparatus; U, a pulley on this shaft, belted to the fan and giving motion to the fan; V, a chain belt transmitting motion from a proper wheel on shaft T to a wheel on distributing-roll J and serving to give rotary motion to roll J; W, wheels on the screen-shaft and conveyer-shaft, by means of which a chain belt may transmit rotary motion to the conveyor; X, a series of shallow inwardly-projecting ribs longitudinally disposed in the perforated screen C; Y, openings in the casing D at the higher end of the screen, one of these openings coming opposite the end of the screen, while the other opening communicates with the chamber below the screen over the conveyer, these openings being provided with screens of perforated metal or wire-cloth which will freely admit air, and Z the discharge end of conduit M.

Wheat coming from ordinary grain-scouring machines carries with it small screenings middlings, dust, &c., and it has been customary, by reason of defects in machinery to let the screenings go to waste along with the middlings.

In my improved machine the wheat as it comes from the scourer goes into spout E, and a light stream is kept passing through the revolving screen C. The screen I prefer to form of perforated metal with holes about five sixty-fourths of an inch in diameter. As the stream of wheat passes through screen C, feeding to the left by reason of the slope of the screen, the ribs X give the wheat a lifting and tumbling action. The little germ and middling parts and dust sift through the screen C and the germ and middling parts drop to the conveyer. The conveyer discharges these parts at G, from whence they may be carried away to be reground. The fan produces a strong suction of air in through the openings Y, this current carrying away the dust which has sifted through the screen and which is inside the screen, and also pulling away the screenings which are inside the screen, the holes in the screen being too small to permit the screenings to drop through to the conveyer. This current carries the dust and screenings toward the fan, and on their route they dive under the trapping-partition Q, the screenings accumulating in the base of the trap and automatically discharging at door S, while the dust goes on and is discharged by the fan. The wheat discharging from screen C falls into passage H, and distributing-roll J causes it to discharge past the gate in a widely-extended thin open regular stream which flows out at Z, and as this stream flows from the gate and roll in its open thin condition it is subjected to the action of a strong upward current of air through conduit M, which carries away any dust remaining in it. Clean grain therefore flows out at Z, pure grain is discharged by the conveyer at G, screenings flow out at S free from dust, and dust comes out at O.

I claim as my invention—

In a rolling screen, the combination, substantially as set forth, of a perforated rotary screen, a grain-inlet at one end thereof, a discharge-passage at the other end thereof, a distributing-roll and gate in said discharge-passage, a casing forming a chamber around the screen, a conveyer in the base of the casing, air-inlets to the casing at the receiving end of the screen, a suction-fan, a suction-conduit connecting said fan with the chamber around the screen and with the interior of the screen and with said discharge-passage beyond said roll and gate, and a screenings-trap in said conduit.

THOMAS A. SEIP.

Witnesses:
J. W. SEE,
P. B. HOLLY.